United States Patent [19]
Bell, Jr.

[11] 3,777,104
[45] Dec. 4, 1973

[54] ELECTRICAL DISCHARGE MACHINE RAM CYCLE CONTROL SYSTEM

[75] Inventor: Oliver A. Bell, Jr., Mooresville, N.C.

[73] Assignee: Colt Industries Operating Corp., New York, N.Y.

[22] Filed: May 30, 1972

[21] Appl. No.: 257,926

[52] U.S. Cl. .............................................. 219/69 G
[51] Int. Cl. ............................................... B23p 1/14
[58] Field of Search ................................... 219/69 G

[56] References Cited
UNITED STATES PATENTS

| | | | |
|---|---|---|---|
| 3,370,147 | 2/1968 | Matulaitis | 219/69 G |
| 3,657,507 | 4/1972 | McNeece | 219/69 G |
| 3,510,620 | 5/1970 | Smith | 219/69 G |
| 3,435,176 | 3/1969 | Lobur | 219/69 G |

Primary Examiner—R. F. Staubly
Attorney—Robert C. Hauke et al.

[57] ABSTRACT

An electrode-carrying ram at controllable intervals is automatically retracted from the cavity being formed in the workpiece. This permits a coolant jet to be externally applied to the cavity to flush out the machining gap. Subsequently, the electrode is fed rapidly downwardly to a position just short of its former cutting level. At this point, the ram is returned to the control of an automatic servo feed system and normal cutting is resumed. A lower actuator is slidably mounted on a vertical track on the ram. Each time there is a downward stroke in the direction of the workpiece the lower actuator is moved slightly upwardly. This continuous progressive upward movement permits the ram and electrode to advance deeper into the workpiece cavity before the normal servo feed operation is restored. The upward movement of the actuator occurs automatically and without any requirement for operator attention.

11 Claims, 4 Drawing Figures

ELECTRICAL DISCHARGE MACHINE RAM CYCLE CONTROL SYSTEM

BACKGROUND OF THE INVENTION

The present invention relates to electrical discharge machining in which material is removed from an electrically conductive workpiece by the action of repeated electrical gap discharges between a tool electrode and the workpiece. An automatic electrode servo feed system controlled by a gap parameter, such as gap voltage or gap current, is used to provide relative movement to maintain an optimum gap spacing between the electrode and the workpiece as material is removed. A dielectric coolant is continuously circulated, filtered and recirculated through the gap during machining operation. For most reliable and predictable results, a power supply circuit of the independent pulse generator type is used to provide machining power pulses of precisely controllable frequency and on-off time to initiate the electrical gap discharges for material removal.

In most electrical discharge machining operations, the electrode is of a size sufficient to permit coolant holes to be bored through it to provide continuous circulation of coolant through the electrode and through the machining gap. In this manner, the eroded particles from the electrode or workpiece are removed from the gap to permit continuation of the machining process. In the event this flow is not continuous and effective to clear the particles from the gap, the gap may become bridged by accumulated particles. Cutting will become progressively more erratic and finally cause a localized effect known as gap short circuit condition. This condition is accompanied by excessive localized heat which tends to damage both electrode and workpiece unless immediate corrective action is taken. Elaborate and expensive protective systems have been devised which are used to interrupt the power from the machining power supply to the gap upon the occurrence of gap short circuit condition.

The present invention is directed toward maintaining an effective periodic flushing action of coolant relative to the gap and cavity so that gap short circuit or DC arcing may be effectively avoided. It will be understood that the present invention is of particular significance and value when the machining operation being carried on involves the use of one or more narrow rib electrodes without coolant flow holes provided in them.

The invention is also important in drilling operations in which the electrodes are boring narrow holes of the "blind hole" type with no coolant exit holes provided through the workpiece itself. Other arrangements, such as a continuously vibrating ram or workpiece table, have been used to attempt to provide a sort of vibratory flushing action in the fluid in the cavity. Problems arise with this method of flushing since there is frequently caused an excessive amplitude vibration of the electrode relative to the workpiece, with a resultant contact between the two which again may either result in gap short circuit or in the actual fracture of the electrode or the protruding portions of the workpiece.

SUMMARY OF THE PRESENT INVENTION

The present invention thus will be seen to provide an electrical system for controlling the operation of a machine tool ram in an EDM operation so that a periodic ram motion to permit coolant flushing, that is, an up and down movement of the ram and electrode, may be preset. The time between the ram movements may be predetermined and in addition to speed of retraction and of return may be adjusted in such manner as to minimize the delay in normal machining operation. To enable a precise control of the ram, there are provided both upper and lower actuators on the ram itself which have a slidable mounting to permit adjustment of their spacing one relative to the other and to therefore control the operation of upper and lower limit switches fixed on the machine head, which control the distance of the retraction and downfeed motion of the ram until normal servo feed operation is resumed. To facilitate adjustments, the switch actuators are slidably held in place by magnetic mountings.

BRIEF DESCRIPTION OF THE DRAWINGS

The present invention will be described in detail in the accompanying specification and drawings, in which like reference numerals are used to refer to like parts where they may be shown in different views, and wherein.

DESCRIPTION OF THE PREFERRED EMBODIMENT

Figure 1:
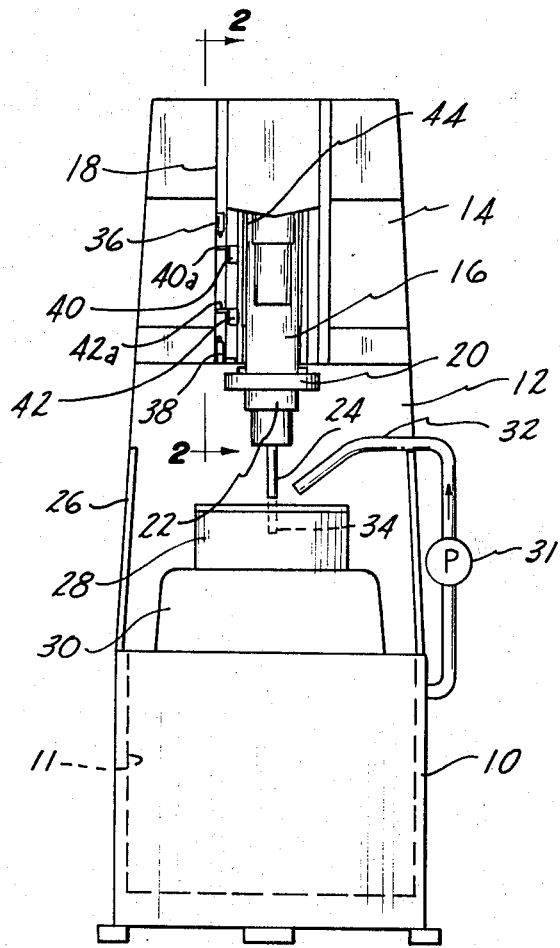
FIG. 1 is a front elevational view of a machine tool for electrical discharge machining.

FIG. 1 shows the basic parts of an electrical discharge machining machine tool which include the base 10, vertical support frame 12 and head 14. The head 14 supports a vertically movable ram 16 which is mounted for longitudinal movement on a pair of vertically disposed ways 18. The ram 16 has attached to its lower end a platen 20 and an electrode holder 22 used to attach an electrode 24 to the ram. The electrical discharge machining machine tool also includes a workpan enclosure 26, the front cover of which is removed in the FIG. 1 drawing to show those parts of particular importance relative to the present invention. The workpiece 28 is supported on a workpiece holder 30, which in turn is positioned on the base 10. The workpan 26 is filled with electrical discharge machining dielectric coolant during operation so that the machining gap between the electrode 24 and the workpiece 28 has a constant flow of fluid therebetween. An electrical discharge machining power supply (not shown) is connected with its output leads across the machining gap to provide machining power pulses thereacross. One type of electrical discharge machining power supply suitable for incorporation with the machine tool is shown and described in sennowitz U. S. Pat. No. 3,649,802, which patent is of common ownership with the present invention. The present invention is particularly useful in its use with blind hole cavity drilling or in the drilling of cavities with electrodes of extremely thin configuration in which there can be no predrilled coolant holes to provide the needed coolant flow.

A coolant tube 32 is shown positioned over the edge of the workpan 26 and directed toward the side of the cavity 34 illustrated in dash line configuration in the workpiece 28. The tube 32 is preferably of a flexible type of material to permit its being directed toward each cavity being formed. The tube 32 has its upper end directed toward the cavity 34 in the workpiece 28 and its lower end connected to a reservoir 11 in the base 10, which serves as a source of the dielectric fluid which is pumped under pressure by a pump 31 upwardly through the tube 32 and directed toward the workpiece cavity 34.

The external control elements of the ram cycle control system include a pair of upper and lower limit switches 36 and 38, respectively, which are located on the head 14 at the left side of the ram 16. A pair of actuators 40 and 42 are mounted at the left hand side of the ram 16, with lateral switch actuating extensions 40a and 42a extending into alignment with the operating plungers of the upper and lower limit switches 36 and 38, respectively. The actuators 40 and 42 are both mounted slidably on individual magnets 40b and 42b on a rail 44 to permit their selective prepositioning relative to the switches 36 and 38, thus to control the distance of retraction and of downfeed of the ram 16 as it is timed in its ram cycle operation. The detail of the slidable mounting structure will be better shown in FIG. 1A hereinafter. Either the switch actuators 40, 42 may include magnets as shown or, alternately, the track 44 may be magnetized to assist their mutual holding relationship.

Figure 1A:
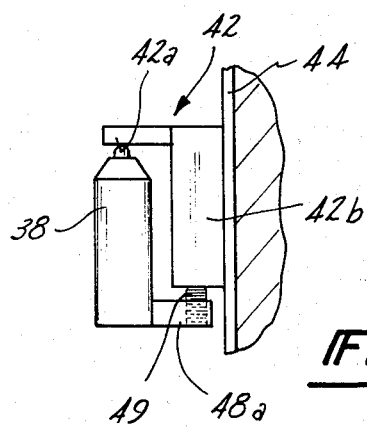
FIG. 1A is a side elevational view to enlarged scale of the lower actuator and associated parts.

The FIG. 1A drawing shows the lower actuator 42, which includes extension 42a, aligned with the plunger of lower limit switch 38. The magnet 42b is slidably mounted on the track 44. The lower projection 48, which is used to mount the lower limit switch 38, includes a lateral extension 48a which carries a vertical adjusting screw 49. The adjusting screw 49 is used to preset the distance above the workpiece 28 at which the normal servo feed is restored. This permits a fast downfeed without allowing contact between the electrode 24 and the workpiece 28.

Figure 2:
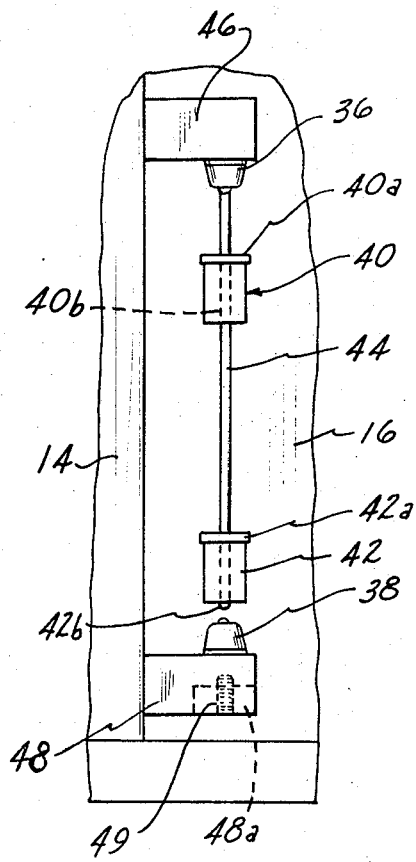
FIG. 2 is a side elevational view of a portion of the head and the ram showing the switches and actuators therefor and their mounting arrangement.

The FIG. 2 drawing, which is drawn to slightly enlarged scale, better shows the general arrangement of the actuating devices and switches. FIG. 2 additionally shows the outward projection 46 on which the upper limit switch 36 is mounted, the lower projection 48 on which the lower limit switch 38 is mounted, as well as the relative position of the actuator 42, its associated magnet 42b and the adjusting screw 49.

Figure 3:
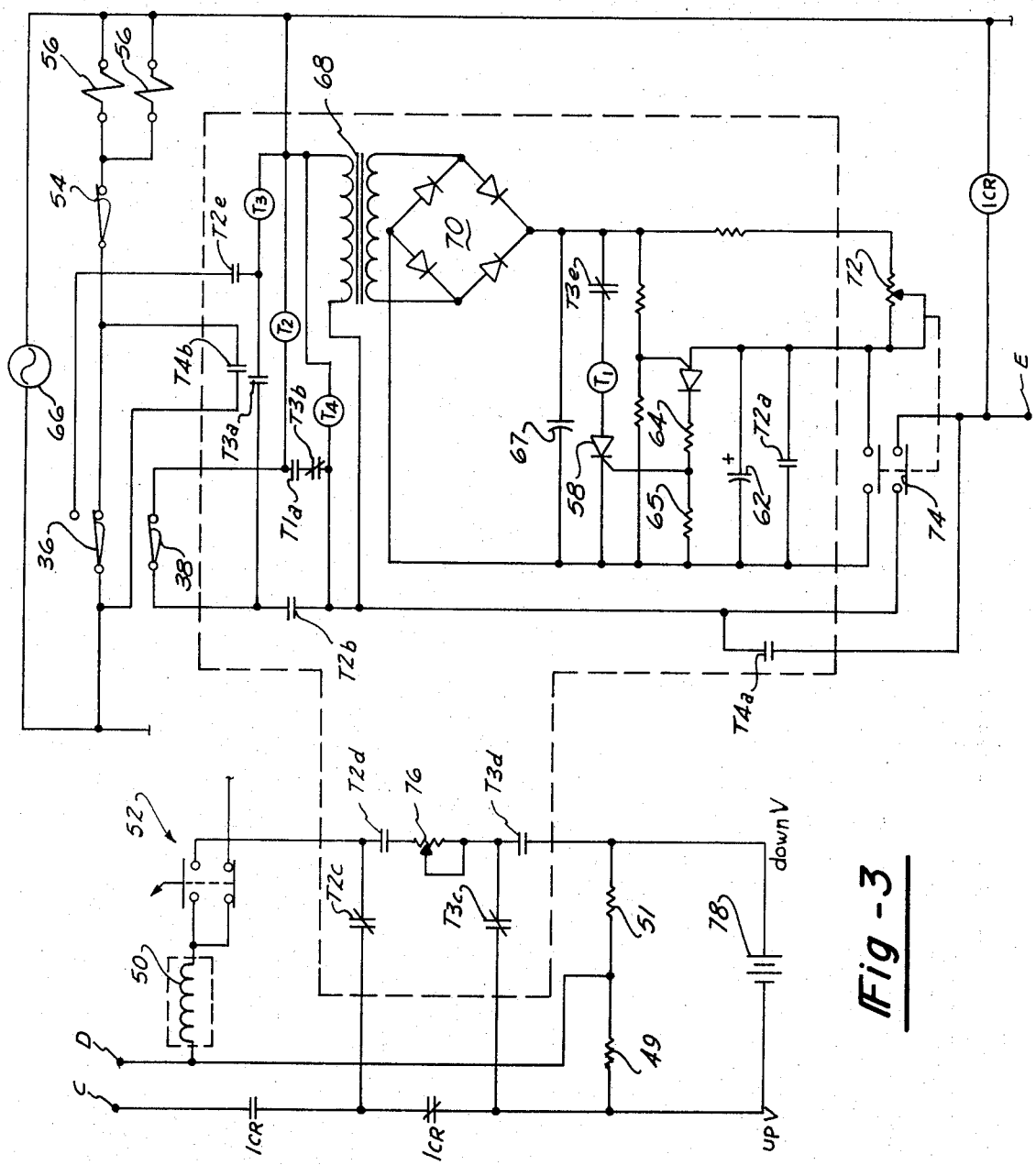
FIG. 3 is a schematic drawing showing the timing control circuit and electromagnetic relays for regulating the retraction and then the subsequent downfeed of the ram during each flushing stroke.

The FIG. 3 schematic shows the ram cycle control circuit and the related basic parts of the servo feed system. The circuit comprising the ram cycle control circuit is illustrated in a dash line box in the FIG. 3 drawing. It will be understood that the servo feed system, whereby the head is operated upwardly and downwardly, may be operated manually, for example, during initial setup or during removal of the finished part. The power feed system is commonly of the electrohydraulic motor type in which there is included an electrical servo valve to control the motor and thus provide up and down feed of the ram 16 and electrode 24. In such a system, there is included a servo valve and coil 50 of which a simplified showing is made in FIG. 3. The valve coil 50 has attached to its two different ends a reference voltage tapped from between resistors 49 and 51 through lead D and a voltage through lead C representative of gap voltage to provide current flow through the coil 50 in a downfeed direction so long as normal machining with normal gap voltage level continues. One example of such an electrically operated servo feed system for EDM is shown in its entirety in U. S. Pat. No. 3,289,029 issued to Robert S. Webb on Nov. 29, 1966 for "Servo Feed Apparatus for Electrical Discharge Machining," which patent is of common ownership with the present application. The detail of the hydraulic motor, the valve and the gap sensing and reference voltage circuit is omitted at this point from the application in the interest of simplification. The servo control switch 52 is illustrated with a showing of the manner in which it is movable between the manual and automatic positions.

The upper right hand portion of the FIG. 3 circuit shows the upper and lower limit switches 36 and 38 in their normal positions. A ram lock operating switch 54, with holding solenoids 56, is shown at the right hand of the drawing. It is the function of the switch 54 to positively lock the ram 16 in a predetermined position when this is required.

The control system according to the present invention includes a group of selectively energized electromagnetic relays and their respective contacts, which serve to control the appropriately timed and cyclical retraction and downfeed of the ram 16. These relays include relays T1, T2, T3 and T4 and their appropriately numbered contacts which are followed with a letter designation for purposes of ready identification and clarification. The timing of operation of the above listed relays is controlled through a silicon controlled rectifier or SCR 58, which in turn is fired by a programmable unijunction transistor or PUT 60. A capacitor 67 is connected across the series combination of the power conducting electrodes of the SCR 58, relay coil T1 and the normally closed contacts T3e. The PUT 60 is operated by the accumulated voltage on the capacitor 62. A first resistor 64 is connected in series between the cathode of the PUT 60 and the gate electrode of the SCR 58. A second resistor 65 is coupled between the resistor 64 and a source of negative voltage.

A source of alternating current potential 66 is shown at the upper portion of FIG. 3 together with a variable transformer 68 and a full wave rectifier 70, which provides the operating voltage for the two semiconductor switches 58 and 60. Also included at the lower right hand portion of the circuit is a cycle control relay 1CR, which is used in each case to enable the operation of the cycle timer circuit. The cycle time, i.e., the time between retractions, is adjustable through a push-type rheostat 72 which is operated in conjunction with the 1CR cycle control relay through a switch 74. The speed of retraction and downfeed are presettable by a rheostat 76 at the left side of the drawing.

DESCRIPTION OF OPERATION

The ram cycle timer is initiated with a momentary start through the depression of the cycle time switch 74 and push rheostat 72. This energizes the relay T4. The switch 74 momentarily discharges the capacitor 62 to zero time the PUT 60. The contacts T4a are closed and hold the relay T4 in by shorting across the cycle time switch 74. The contacts T4b are closed to hold the solenoids 56 energized across the terminals of the upper limit switch 36.

The programmable unijunction transistor 60 starts the timing through the charging of the capacitor 62. The programmable unijunction transistor 60 then fires to provide a triggering pulse to the gate of the silicon controlled rectifier 58, which is then triggered into conduction. The SCR 58 energizes the relay T1 through its principal electrodes through the contacts T3e. The relay T2 is then actuated by the closing of the normally open contacts T1a. The contacts T2a are then closed to short out the terminals of the programmable unijunction transistor 60 to return the time to zero. The contacts T2b are closed to apply a voltage to the terminals of the bottom limit switch 38. With reference to the left hand portion of the circuit, contacts T2c are opened to remove the servo control voltage from the left hand C voltage line. At the same time, the T2d relay contacts are closed to apply an "up" polarity voltage from a DC source 78 to the servo coil 50 through the contacts T3c and adjustable voltage rheostat 76. It will be noted that the auxiliary DC supply 78 is included in the left hand circuit to provide the "up" and "down" polarity voltage required during the cycle timing operation. At the same time the relay contacts T2e ready the relay coil T3 operating voltage to make it available as soon as the upper limit switch 36 is actuated.

Now with reference to FIGS. 1 and 2, the ram 16 is driven upwardly until the upper actuator extnsion 40a comes into contact with the plunger of the switch 36 thus to actuate it. The relay T3 is then energized through the previously closed contacts T2e. The contacts T3a are then closed to hold the relay T3 energized through the now closed contacts T2b. The contacts T3b then open the current flow path to relay T2 through the relay contacts T1a and allow the bottom limit switch, namely the limit switch 38, to hold the relay Te energized. The contacts T3c are opened to remove the "up" polarity voltage previously furnished to the right hand terminal of the servo control coil 50. The relay contacts T3d then apply a "down" polarity voltage to the right hand terminal of the servo control coil 50. The relay contacts T3e open to remove current flow to relay T1 and thus deenergize it. The relay T2 is then readied for the second sequence of operation.

In the second sequence of operation, the ram 16 is moved downwardly carrying the electrode 24 toward the workpiece 28 until it strikes the lower limit switch provided. The actuator 42 and its outward extension 42a make the lower limit switch 38. The operation of the lower limit switch 38 serves to deenergize the relay T2. The contacts T2a are opened from their previous shorting condition across the resistors 64, 65 and programmable unijunction transistor 60 to allow for the repeat of the sequence. The contacts T2b are opened to remove the voltage previously applied to the lower limit switch 38 and to drop out the relay T3. The contacts T2c are then closed to connect the C voltage line to the servo coil 50 and thus provide a control voltage to the right hand end of the servo control coil 50 to permit normal servo feed operation of the ram 16. The contacts T2d at the same time remove the auxiliary voltage 78 from the servo coil 50 and the relay contacts T2e remove the voltage available to the upper limit switch 36. Since relay T3 has been returned to its normal state, the programmable unijunction transistor 60 and silicon controlled rectifier 58 are in readiness to start the cycle over again to repeat the retraction and downfeed cycle. It will be understood that when operating voltage is removed from the lead E by interrupting the cutting operation, the timer must again be reset by the operation of the switch 74 and the push rheostat 72.

An important feature of my ram cycle control system resides in the manner in which the lower magnet 42b and actuator 42 are constantly adjusting for movement. In accordance with the setting of adjusting screw 49, there is a downfeed at a relatively fast velocity until the lower limit switch 38 is actuated. The lower magnet 42b and the actuator 42 are progressively moved upward on the ram 16 as the cut in the workpiece gets deeper. This permits the ram 16 and electrode 24 to advance deeper into the cavity each time before normal servo feed operation is restored.

It will thus be seen that I have provided a novel and improved ram cycle control system for EDM which greatly improves ribbed and blind hole cutting.

What is claimed is:

1. In an electrical discharge machining apparatus having a tool electrode bearing ram longitudinally movable on a head and operable by a servo feed means to feed the electrode toward a workpiece and maintain a relatively uniform machining gap therebetween during normal cutting; a periodically actuated system for providing a predetermined up and down cycling of the ram to provide coolant flushing of the gap, said system comprising an upper limit switch and a spaced lower limit switch, both mounted on the machine tool head, a selectively adjustable upper and lower actuator means, each mounted on said ram and engageable respectively with the upper and lower switches for providing a retraction and a downfeed of the ram to a point proximate where the initial retraction was begun when normal cutting is required under control of said servo feed means; and a stop mounted proximate said lower switch and engageable with said lower actuator means, said lower actuator means slidable vertically on said ram each time a down cycle is completed.

2. The combination as set forth in claim 1 wherein a track is mounted on said ram and said upper and lower actuators are differentially positionable on said track to space said upper actuator in its alignment with said upper and lower limit switch to adjust the distance of retraction.

3. The combination as set forth in claim 2 wherein said upper and lower actuators are of a ferro-magnetic material, said actuators being held on said track by the force of magnetic attraction.

4. The combination as set forth in claim 1 wherein a means is operably connected to said servo feed means for adjusting the speed of retraction of said ram responsive to the actuation of the lower limit switch and the speed of downfeed of said ram responsive to the actuation of the upper limit switch.

5. The combination as set forth in claim 4 wherein said adjusting means comprises a rheostat operably connected to said servo feed means.

6. In an electrical discharge machining apparatus having a tool electrode bearing ram movable on a head and operable by an automatic servo feed means to feed the electrode tool toward a workpiece and maintain a relatively uniform machining gap therebetween during normal cutting; a system for providing a periodic up and down cycling of the ram to provide coolant flushing of the gap, said system comprising an upper limit switch and a lower limit switch spaced therefrom, both of said switches mounted on the machine tool head, an upper and a lower actuator means, each mounted on said ram, movable therewith and engageable respectively with said upper and lower limit switches, said upper switch operable to provide downfeed of said ram, said lower switch operable to enable operation of said automatic servo feed means whereby normal cutting is resumed, said lower actuator means slidable vertically on said ram, a stop means fixed proximate said lower limit switch and engageable with said lower actuator means, said lower actuator means being continuously slid upwardly as the result of each contact with said stop means, a timing means for periodically rendering the aforesaid system operable, said timing means including an electronic switch, and an adjustable time-constant circuit for controlling the triggering of said electronic switch.

7. The combination as set forth in claim 6 wherein said electronic switch comprises a silicon controlled rectifier and a programmable unijunction transistor is operably connected to the gate electrode of said silicon controlled rectifier for periodically triggering it conductive and initiating operation of said system.

8. The combination as set forth in claim 6 wherein a track is mounted on said ram for holding said actuators, and wherein said actuators include a magnet for providing a holding force between them and said track.

9. In an electrical discharge machining apparatus having a tool electrode bearing ram movable on a head and operable by an automatic servo feed means to feed the electrode toward the workpiece and maintain a relatively uniform feeding gap therebetween during normal cutting; a system for providing periodic retraction and downfeed cycle of the ram to provide a coolant flushing of the gap, said system including an upper limit switch mounted on the machine tool head, an actuator for said upper limit switch mounted on said ram and movable therewith, said upper limit switch operable to provide a downfeed of said ram responsive to its actuation, a timing means for periodically rendering said system operable for interrupting operation of said servo feed means and by initiating the retraction movement of said ram; and a means operatively connected to said ram and head for reenabling the operation of the automatic servo feed means at successively lower points to resume normal feeding after completion of a retraction and downfeed cycle, said last mentioned means comprising a lower limit switch mounted on said head and an actuator therefor mounted on said ram, said actuator displaceable upwardly at the end of each downfeed cycle to establish said points.

10. The combination as set forth in claim 9 wherein said actuators are both slidably mounted on a track, said track fixed to said ram with its axis aligned with the path of movement of said ram.

11. In an electrical discharge machining apparatus having a tool electrode bearing ram longitudinally movable on a head and operable by a servo feed means to feed the electrode toward a workpiece and maintain a relatively uniform machining gap therebetween during normal cutting; a periodically actuated system for providing a predetermined up and down cycling of the ram to provide coolant flushing of the gap, said system comprising an upper limit switch and a spaced lower limit switch, both mounted on the machine tool head, a selectively adjustable upper and lower actuator means, each mounted on said ram and engageable respectively with the upper and lower switches for providing a retraction and a downfeed of the ram to a point proximate where the initial retraction was begun when normal cutting is required under control of said servo feed means; and an adjustable stop mounted proximate said lower limit switch and engageable with said lower actuator means for adjusting the distance above the workpiece at which normal cutting operation of said servo feed means is restored, said lower actuator including a lower magnetized portion engageable with said stop to provide a progressive upward sliding movement of said lower actuator as the cut in said workpiece becomes deeper.

* * * * *